(12) United States Patent
Suzuki

(10) Patent No.: US 6,478,992 B1
(45) Date of Patent: Nov. 12, 2002

(54) EXTRUSION MOLDING METHOD FOR A THIN TUBE

(75) Inventor: Yasuyuki Suzuki, Tokyo (JP)

(73) Assignee: Suzuki Kanshi Co., Ltd., Tokyo (JP)

( * ) Notice: Subject to any disclaimer, the term of this patent is extended or adjusted under 35 U.S.C. 154(b) by 0 days.

(21) Appl. No.: 09/534,024

(22) Filed: Mar. 24, 2000

(30) Foreign Application Priority Data

Sep. 30, 1999 (JP) ............................................ 11-278918

(51) Int. Cl.[7] .............................................. B29C 49/04
(52) U.S. Cl. ....................... 264/40.3; 264/560; 264/565; 264/209.4; 425/380
(58) Field of Search ................................. 264/560, 565, 264/209.4, 210.2, 280, 40.3; 425/380

(56) References Cited

U.S. PATENT DOCUMENTS

| 3,907,484 A | * | 9/1975 | Delorme et al. ............. 425/380 |
| 3,993,723 A | * | 11/1976 | Davis et al. ............. 264/178 R |
| 4,025,253 A | * | 5/1977 | Havens ........................ 264/565 |
| 4,548,634 A | * | 10/1985 | Shibaoka et al. .............. 65/229 |
| 4,784,772 A | * | 11/1988 | Gotoh et al. ................. 210/259 |
| 5,264,162 A | * | 11/1993 | Salem et al. ................. 264/103 |
| 5,413,810 A | * | 5/1995 | Mastalski ..................... 118/62 |

* cited by examiner

Primary Examiner—Mark Eashoo
(74) Attorney, Agent, or Firm—Sughrue Mion, PLLC

(57) ABSTRACT

An extrusion molding method including plasticizing and kneading a raw material (1), composed of a synthetic resin material having high heat-resistance and strength, extruding the material from a molding die (3) to form a tubular body (51), passing the tubular body (51) on a sizing die (4) to give it a final inner diameter, cooling and hardening the tubular body (51). The molding die (3) and sizing die (4) are coupled to each other by a connecting pipe (6). The sizing die (4) is made of a carbon material. A first air (81) is supplied to an interior of the sizing die (4) through the connecting pipe (6). A second air (92) is supplied to an interior of the molding die (3) so that an air lubrication layer is formed between an inner surface (52) of the continuous product (5) and an outer surface (41) of the sizing die (4).

3 Claims, 5 Drawing Sheets

EXTRUSION MOLDING METHOD FOR A THIN TUBE

BACKGROUND OF THE INVENTION

This invention relates to an extrusion molding method for producing a continuous product, in particular a tube with a thin thickness or a thin tube made of a synthetic resin material and also relates to an extrusion molding apparatus for carrying out the method.

Heretofore, an extrusion molding method for a thin tube made of a synthetic resin material has formed a continuous product for a thin tube by plasticizing and kneading a raw material composed of a synthetic resin material by means of an extrusion molding machine, extruding the plasticized and kneaded raw material from a molding die to form a tubular body having a circular cross section, further passing the tubular body on a sizing die to give a final inner diameter to the tubular body, and cooling and hardening the tubular body. The formed material which had passed through the molding die and sizing die fell down naturally or was forcedly drawn (pulled down) and then stacked as it was or taken up onto a reel.

Recently, a high heat-resistance and high strength synthetic resin material such as polyether imide (hereinafter merely referred to "PEI"), polyeter ether ketone (hereinafter merely referred to "PEEK"), or the like have been used as a material for a voice coil bobbin.

Heretofore, a material for use in a sizing die utilized in an extrusion molding apparatus for a thin tube made of a most common synthetic resin material is a metal material having a high heat transfer rate and a rich lubrication, for example, brass or the like. Brass includes many additives such as a filling material and causes a roughness in grain size level on a contacting surface of a sizing die. This roughness of surface gives a very excellent character to a sizing die for extrusion molding a thin tube made of a common synthetic resin material. Also, brass can give the same effect to the sizing die, although the surface finishing accuracy is lowered. However, loading is caused on a contacting surface of the sizing die in use and this lowers durability in wear and stability in size.

On the other hand, a continuous product for a tube made of PEI, PEEK, or the like has a mirror-like finished surface and high mechanical strength. In the case where such continuous product comes into contact with a sizing die having a high heat transfer rate, the continuous product will be instantaneously cooled (in particular, this tendency will often occur in a thin tube.) and wind around the sizing die with a strong force due to its high mechanical strength. This causes a very high frictional force to occur between them. Consequently, the continuous product will not fall freely, or it will be difficult to draw the continuous product. In particular, such tendency will be remarkable in the case where a metallic sizing die has a mirror-like surface.

In order to overcome this problem, a Teflon (trade name; PTFE in a formal abbreviated word) coating may be applied to a contacting surface of a sizing die. However, a synthetic resin material having a high forming temperature such as PEI involves a new problem of heat-resistance in the coating.

Thus, it was almost impossible to form a continuous product for a thin tube made of PEI, PEEK, or the like by means of an extrusion molding method.

Accordingly, an object of the present invention is to provide an extrusion molding method and apparatus for a thin tube made of a synthetic resin material having high heat-resistance and high strength (for example, PEI, PEEK, or the like).

SUMMARY OF THE INVENTION

An extrusion molding method in accordance with the present invention forms a continuous product for a thin tube by plasticizing and kneading a raw material composed of a synthetic resin material by means of an extrusion molding machine, extruding the plasticized and kneaded raw material from a molding die to form a tubular body having a circular cross section, further passing the tubular body on a sizing die to give a final inner diameter to the tubular body, cooling and hardening the tubular body. The extrusion molding method is characterized by the steps of coupling the molding die and the sizing die to each other by a connecting pipe; making the sizing die from a carbon material; supplying a first air to an interior of the sizing die through the connecting pipe; and supplying a second air to an interior of the molding die so that an air lubrication layer is formed between an inner surface of the continuous product and an outer surface of the sizing die.

Preferably, the synthetic resin material has high heat-resistance and high strength (for example, polyether imide (PEI), polyeter ether ketone (PEEK), or the like). A frictional resistance caused between the inner surface of the continuous product and the outer surface of the sizing die may be adjusted by controlling flow rate and pressure of the second air.

An extrusion molding apparatus in accordance with the present invention carries out the extrusion molding method wherein a continuous product for a thin tube is formed by plasticizing and kneading a raw material composed of a synthetic resin material by means of an extrusion molding machine, extruding the plasticized and kneaded raw material from a molding die to form a tubular body having a circular cross section, further passing the tubular body on a sizing die to give a final inner diameter to the tubular body, cooling and hardening the tubular body. The apparatus comprises: a connecting pipe for coupling the molding die and the sizing die to each other, the sizing die being made of a carbon material; a first air supplying pipe which passes longitudinally through the connecting pipe and has an upper end coupled to a first air supplying source and a lower end which extends into an exterior of the sizing die and communicates with an interior of the sizing die; and a second air flow passage defined in the interiors of the extrusion molding machine and the molding die so that the second air is supplied to the interior of the continuous product. The first air is exhausted as a third air through the connecting pipe out of the extrusion molding machine after the first air cools the sizing die. The second air passes through a space defined between the inner surface of the continuous product and the outer surface of the sizing die and leaves the continuous product.

The sizing die includes an inner diameter control portion which controls an inner diameter of the continuous product along its longitudinal direction, and a heat quantity adjustment portion which absorbs a residual heat in the continuous production. A ratio (L1/L2) of a length (L1) of the inner diameter control portion of the sizing die to a length (L2) of the heat quantity adjustment portion is preferably set to be within a range of 0.1 to 5.0. A plurality of metallic material rods for reinforcement may be embedded in the sizing die in a manner that the rods extend in a longitudinal direction of the sizing die and are spaced apart from each other in a circumferential direction of the sizing die or a metallic net for reinforcement may be embedded in the sizing die in an annular arrangement. The sizing die may be provided on the heat quantity adjustment portion with a convergently tapered part to adjust a quantity of heat absorption. Preferably, a volume of the tapered part is set to be within a range of 10 to 300% of a volume of an untapered part.

Since the carbon material which constitutes the sizing die is porous, a frictional force on the outer surface of the sizing die is low. Consequently, there is little change of the dimension of the sizing die due to wear and tear. Further, an air in micro cavities on the outer surface of the sizing die will inflate simultaneously when the air comes into contact with the continuous product, and thus results in a separation effect between the continuous product and the outer surface of the sizing die. Since the contacting area of the carbon material is smaller than that of the metallic material although the heat transfer rate of the carbon material is the same as that of the metallic material, a cooling speed for the continuous product is low, whereby a force which clamps the sizing die by the continuous product becomes small. The above effect will be continued, since the interior of the sizing die is cooled by the air.

BRIEF DESCRIPTION OF THE DRAWINGS

The foregoing and other features of the present invention will become apparent to one skilled in the art to which the present invention relates upon consideration of the invention with reference to the accompanying drawings, wherein.

DETAILED DESCRIPTION OF THE INVENTION

Referring now to FIGS. 1 to 8, embodiments of an extrusion molding method and apparatus for a tube having a thin thickness or a thin tube in accordance with the present invention will be explained below.

Figure 1:
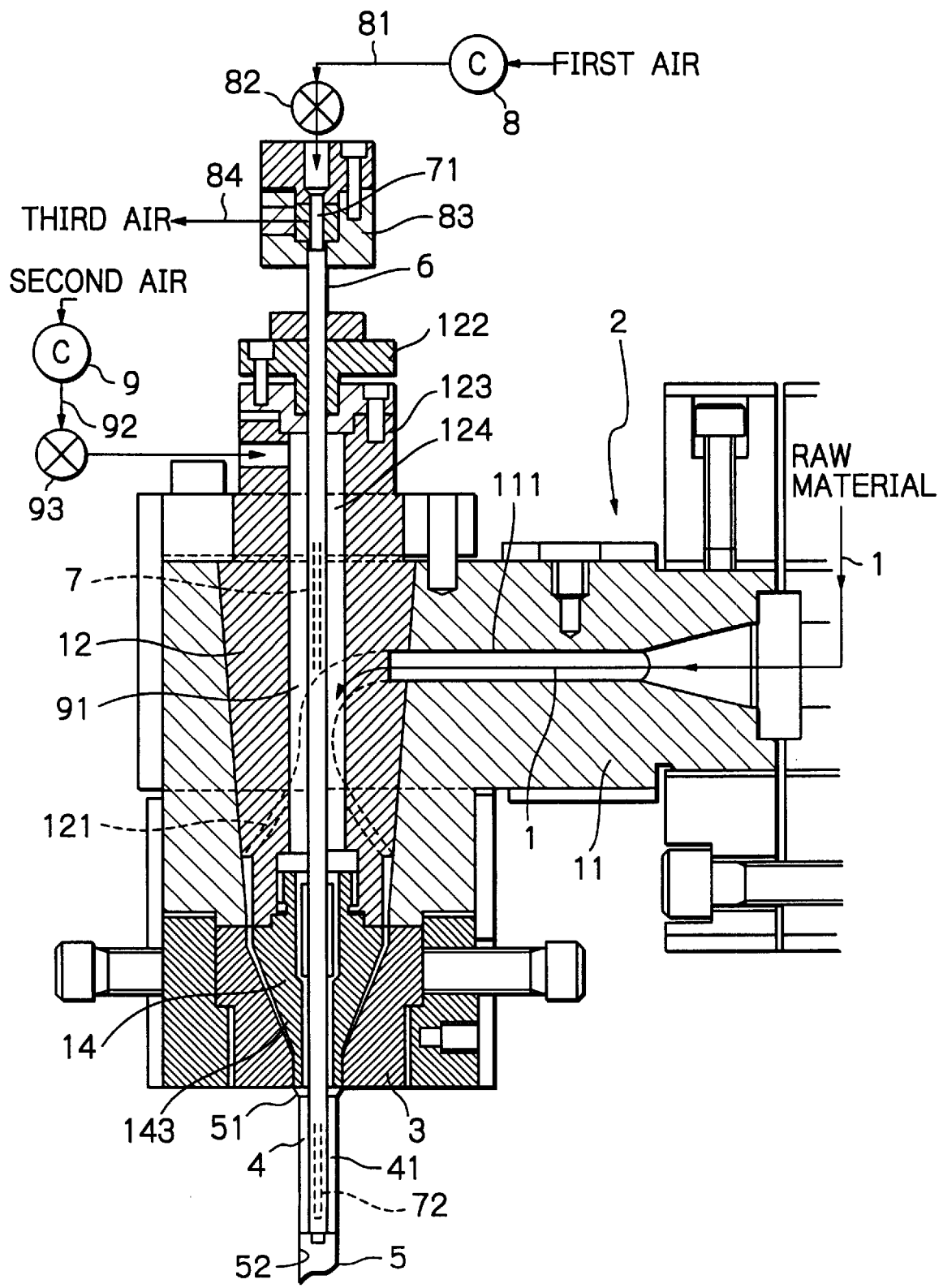
FIG. 1 is a sectional view of an extrusion molding apparatus for a thin tube in accordance with the present invention, illustrating a schematic construction of the apparatus.

FIG. 1 is a sectional view of an extrusion apparatus for a thin tube in accordance with the present invention, illustrating a schematic construction of the apparatus. An extrusion molding apparatus in accordance with the present invention, as shown in FIG. 1 schematically, forms a continuous product 5 for a thin tube by plasticizing and kneading a raw material 1 composed of a synthetic resin material having high heat-resistance and high strength (for example, PEI material, PEEK material or the like) by means of an extrusion molding machine 2, extruding the plasticized and kneaded raw material from a molding die 3 to form a tubular body 51 having a circular cross section, further passing the tubular body 51 on a sizing die 4 to give a final inner diameter to the tubular body 51, cooling and hardening the tubular body 51. A detailed explanation concerning a main part of the extrusion molding apparatus is omitted here, since the main part is substantially the same as that of a conventional extrusion molding apparatus.

The raw material 1 passes through a passage 111 of a crosshead body 11, a passage 121 of a mandrel body 12, a passage 143 defined between a mandrel 14 and a molding die 3, and leaves the apparatus. Then, the raw material 1 is formed into a cylindrical product 51 and passes the sizing die 4 while sliding on the outer surface of the sizing die 4 (see FIG. 5). Thereafter, the cylindrical product or tubular body 51 is cooled and hardened by a cooling machine (not shown) to form a continuous product 5. The continuous product 5 is taken up onto a reel (not shown).

Figure 4:
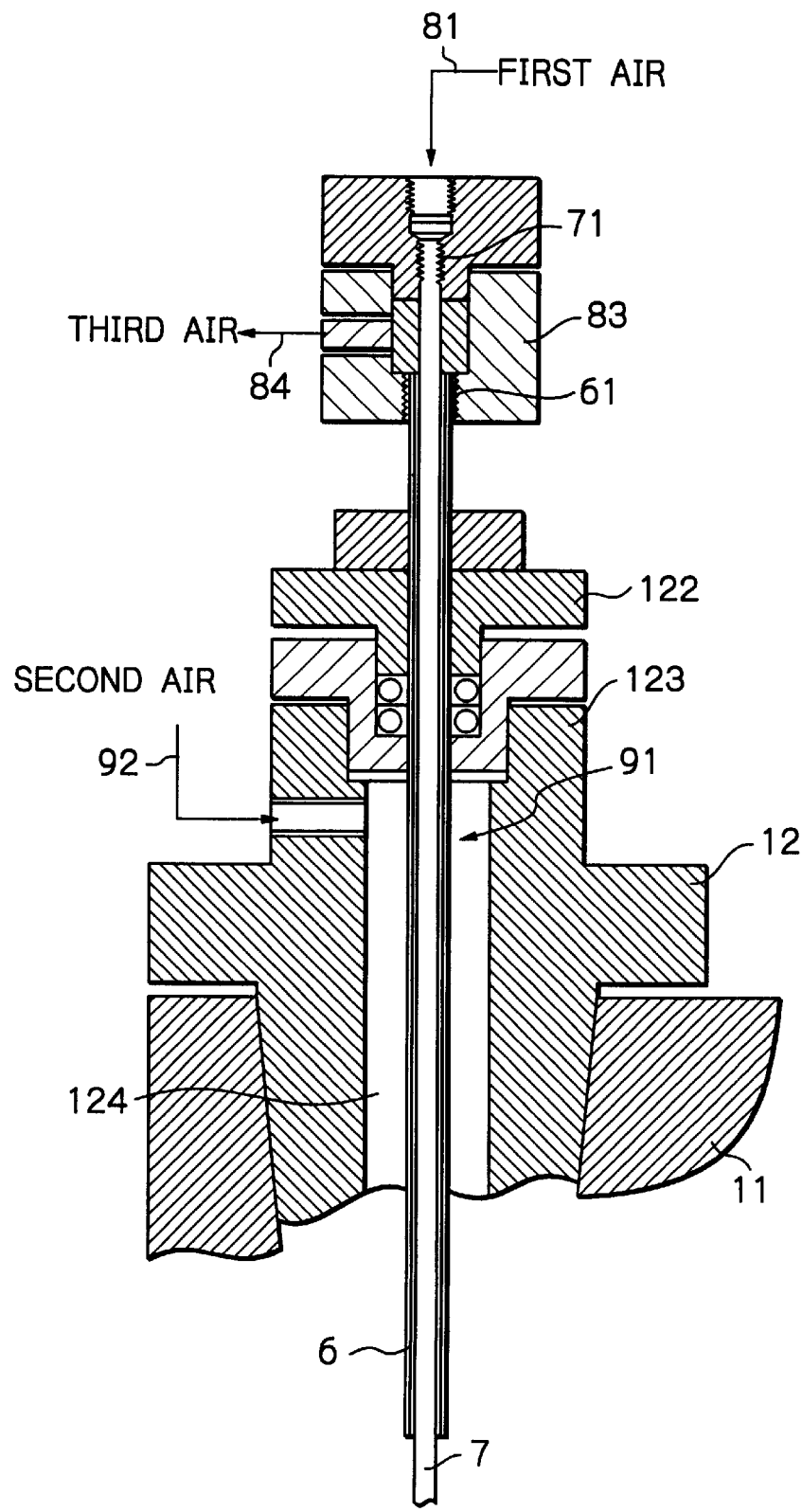
FIG. 4 is a sectional view of an upper part of the extrusion molding apparatus in FIG. 1, illustrating an air flow path to the sizing die.
Figure 5:
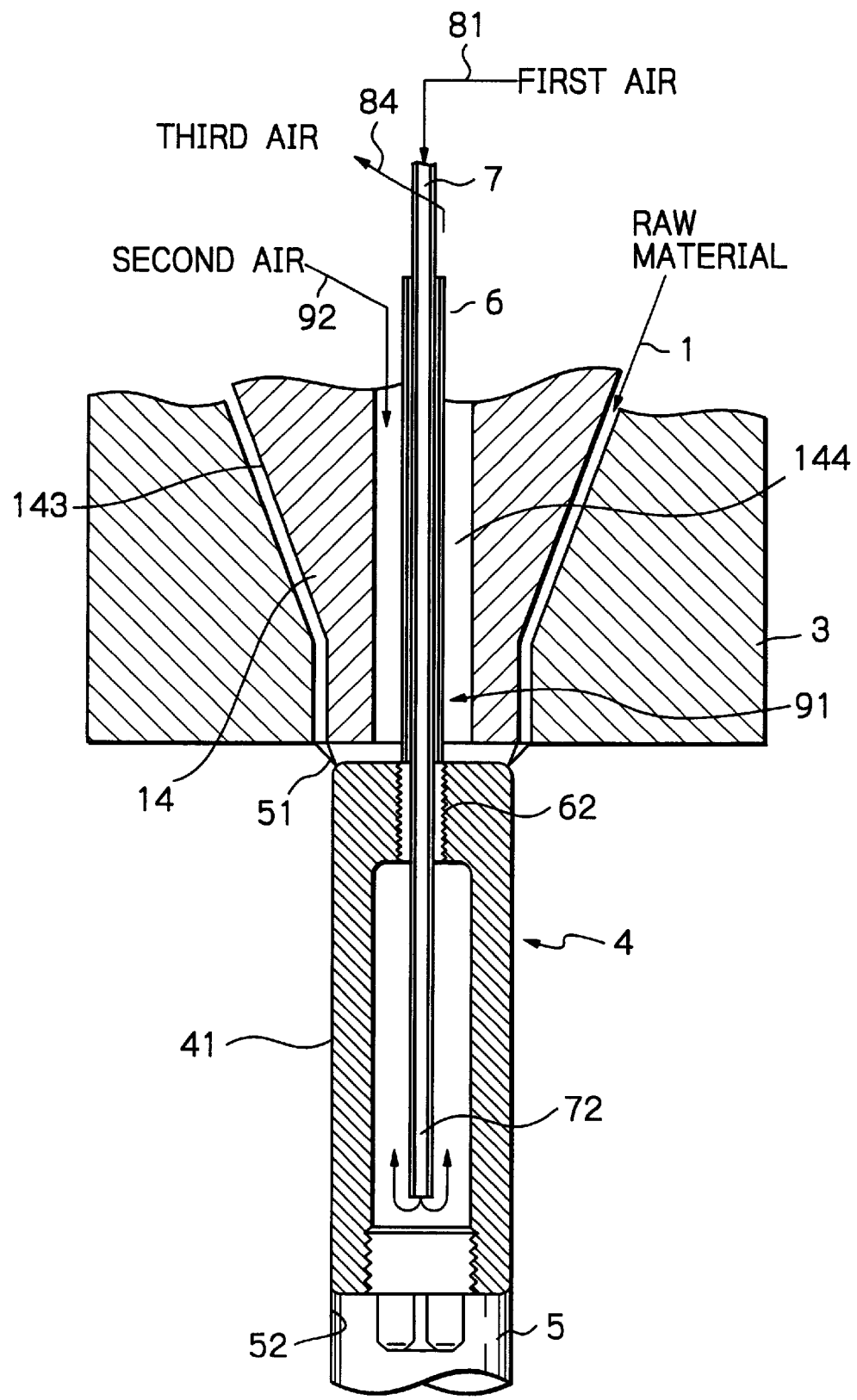
FIG. 5 is a sectional view of a lower part of the extrusion apparatus in FIG. 1, illustrating the air flow path and a raw material supply path to the sizing die.

The extrusion molding apparatus for a thin tube in accordance with the present invention, as best shown in FIGS. 1, 4, and 5, includes the sizing die 4 made of a carbon material, a connecting pipe 6 for coupling the molding die 3 and the sizing die 4 to each other, a first air supplying pipe 7 which passes longitudinally through the connecting pipe 6 and has an upper end 71 coupled to a first air supplying source 8 and a lower end 72 communicated to an interior of the sizing die 4, and a second air flow passage 91 defined in the interiors of the extrusion molding machine 2 and the molding die 3 so that a second air 92 is supplied to the interior of the continuous product 5.

As shown in FIGS. 1, 4, and 5, an upper end 61 of the connecting pipe 6 is screwed into a connector 83 (see FIG. 4) while a lower end 62 of the connecting pipe 6 is screwed into the sizing die 4 (see FIG. 5). A spaced distance between the molding die 3 and the sizing die 4 is controlled by an adjustment metallic member 122 fixed on an upper end 123 of the mandrel body 12. An upper end 71 of the first air supplying pipe 7 extends through the upper end 61 of the connecting pipe 6 and is screwed into the connector 83.

As best shown in FIGS. 1, 4 and 5, the first air supplying source 8 supplies a first air 81 through a flow rate adjustment valve 82 to the connector 83 and feeds the air through the first air supplying pipe 7 into the sizing die 4, thereby cooling the sizing die 4 from its interior. The first air 81 which is heated by a heat exchange between the sizing die 4 and the first air rises in the connecting pipe 6 from its lower end 62, reaches the connector 83, and leaves the connector 83 as a third air 84.

As best shown in FIGS. 1, 4, and 5, a second air supplying source 9 supplies a second air 92 through a flow rate adjustment valve 93 from an upper end 123 of the mandrel body 12 to the second air passage 91. The second air 92 passes through a space defined between an inner surface 52 of the continuous product 5 and an outer surface 41 of the sizing die 4 and leaves the continuous product 5. At that time, the second air 92 forms an air lubrication layer between the inner surface 52 of the continuous product 5 and the outer surface 41 of the sizing die 4. The second air passage 91 is defined in the extrusion molding machine 2 and molding die 3. In more detail, the second air passage 91 includes a longitudinal bore 124 in the mandrel body 12 which is supported in the crosshead body 11 of the extrusion molding machine 2, a longitudinal bore 144 in the mandrel 14 which is fixed on a distal end of the mandrel body 12 and supported in the molding die 3. As shown in the drawings, the connecting pipe 6 passed through the second air passage 91 and the first air supplying pipe 7 further passes through the connecting pipe 6. Each of given clearances is provided between them, respectively. Thus, the respective clearances define the respective air passages.

A frictional resistance caused between the inner surface 52 of the continuous product 5 and the outer surface 41 of the sizing die 4 is adjusted by controlling a flow rate and a pressure of the second air 92.

Figure 2:
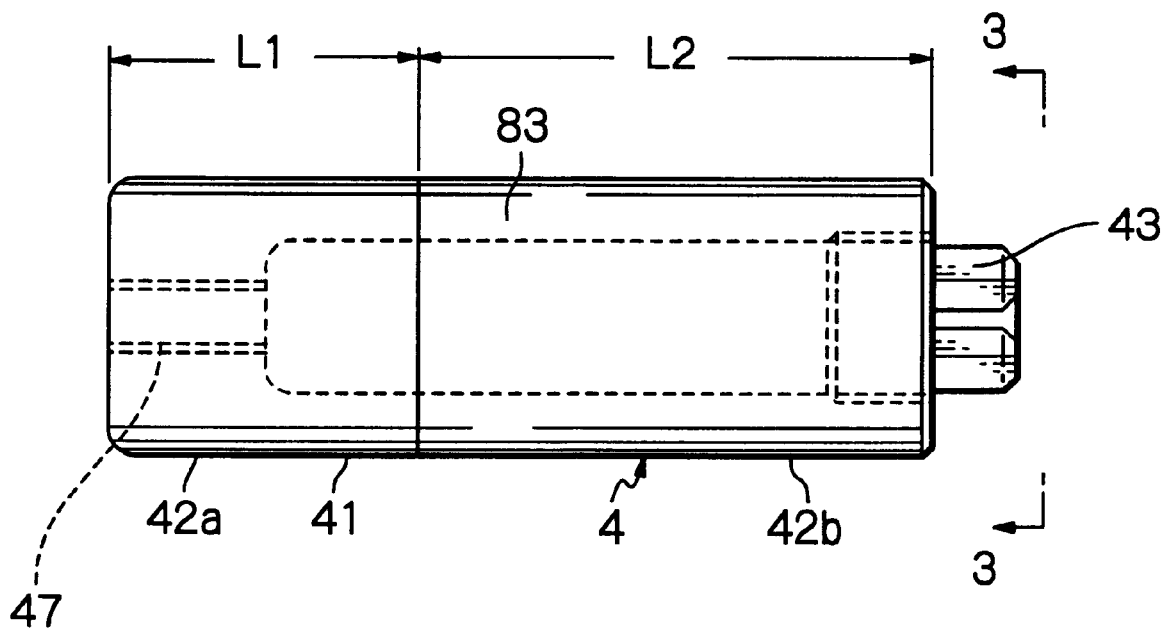
FIG. 2 is a side elevational view of a sizing die to be utilized in the apparatus of the present invention.
Figure 3:
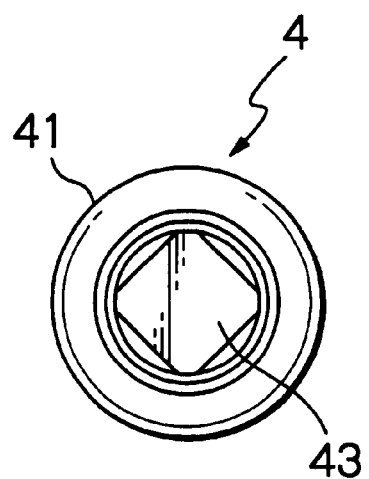
FIG. 3 is a bottom view of the sizing die taken along line 3—3 in FIG. 2.

Next, embodiments of the sizing die 4 in accordance with the present invention will be described by referring to FIGS. 2, 3, 6 to 8. FIGS. 2 and 3 are a side elevational view and a bottom view of a basic embodiment of the sizing die 4 in accordance with the present invention, respectively. In FIGS. 2 and 3, the sizing die 4 includes a hollow sizing die body 42 and a plug 43 which is adapted to be screwed in an end of the body 42. These parts are made of a carbon material. The plug 43 may be made of another material. The sizing die 4 is provided on an inner surface of the other end of the sizing die 4 with a female thread 47, which engages with the lower end 62 of the connecting pipe 6, as mentioned above.

The sizing die body 42 includes an inner diameter control portion 42a which controls an inner diameter of the continuous product 5 along its longitudinal direction, and a heat quantity adjustment portion 42b which absorbs a residual heat in the continuous production. Preferably, a ratio (L1/L2) of a length L1 of the inner diameter control portion 42a of the sizing die 4 to a length L2 of the heat quantity adjustment portion 42b is set to be within a range of 0.1 to 5.0. If the ratio L1/L2 is less than 0.1, the control of the inner diameter and the formation of the air lubrication layer become poor and if the ratio is more than 5.0, the heat absorption effect is lowered and the continuous product 5 is hard to slide on the sizing die 4.

Figure 6:
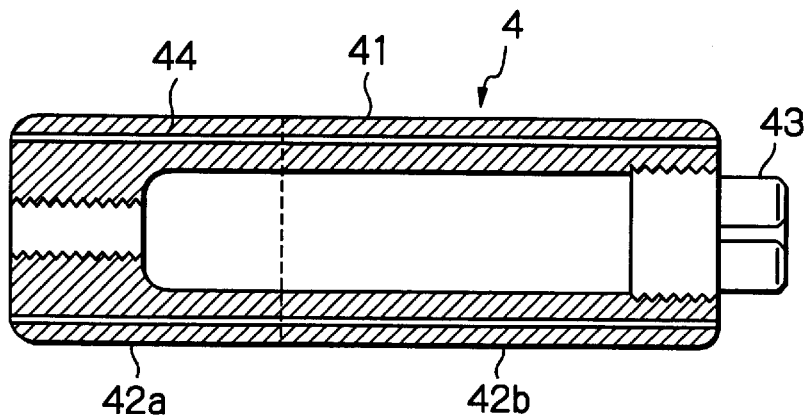
FIG. 6 is a longitudinal sectional view of another embodiment of the sizing die.
Figure 7:
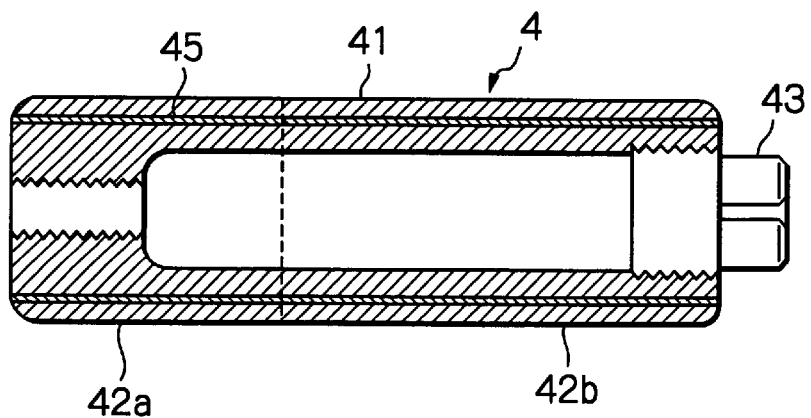
FIG. 7 is a longitudinal sectional view of still another embodiment of the sizing die.
Figure 8:
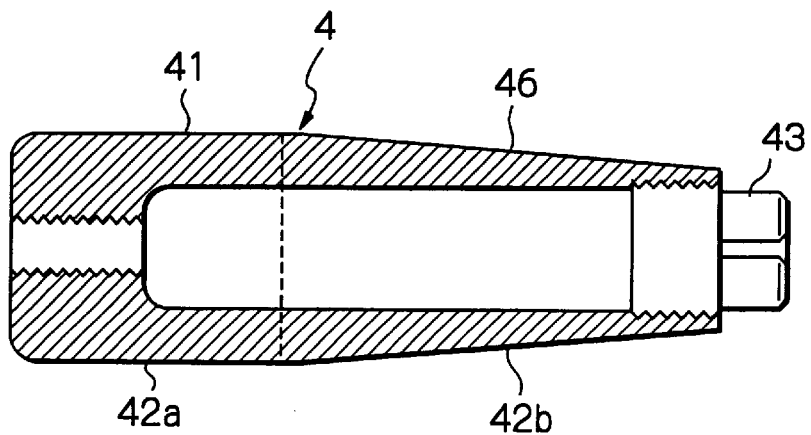
FIG. 8 is a longitudinal sectional view of still further another embodiment of the sizing die.

FIGS. 6 to 8 show another embodiment of the sizing die 4. The sizing die body 42 may have insufficient strength in some cases, since the sizing die body is made of a carbon material. In these cases, a plurality of metallic material rods 44 for reinforcement may be embedded in the sizing die body 42 such that the rods 44 extend in a longitudinal direction of the sizing die body 42 and are spaced apart from each other in a circumferential direction of the sizing die body 42 (FIG. 6) or a metallic net 45 for reinforcement may be embedded in the sizing die in an annular arrangement (FIG. 7).

As shown in FIG. 8, the sizing die body 42 may be provided on the heat quantity adjustment portion 42b with a convergently tapered part 46 to adjust a quantity of heat absorption. Preferably, a volume of the tapered part 46 is set to be within a range of 10 to 300% of a volume of an untapered part. The heat absorption effect is poor without the range.

EXAMPLE 1

An example 1 of the method and apparatus in accordance with the present invention will be described below.

A continuous product 5 for a thin tube (55 μm in thickness) made of PEI was produced under the following conditions by using a sizing die 4 made of a carbon material.

Dimension of the sizing die 4: outer diameter of 25.8 mm×whole length of 70 mm (L1=L2=35 mm);

Extrusion molding machine 2: cylinder diameter of 30 mm, cylinder aspect ratio (length L/diameter D) of 24, screw revolution number of 10.0 rpm, take-up speed of 4.9 M/min, molding temperature of 330 to 350° C.;

First air 81: flow rate of 0.1 l/min, pressure of 0.02 $kg/cm^2$;

Second air 92: flow rate of 150 l/min, pressure of 0.5 $kg/cm^2$.

This result will demonstrate that the continuous product is of sufficient quality for a voice coil bobbin.

According to the present invention, it is possible to produce a thin tube made of the PEI, PEEK, or the like, which was hard to be produced by the conventional art without involving a drastic alteration of a existing apparatus, and it is also possible to obtain a stable quality of the thin tube.

From the above description of the invention, those skilled in the art will perceive improvements, changes and modifications. Such improvements, changes and modifications within the scope of the art are intended to be covered by the appended claims.

The entire disclosure of Japanese Patent Application No. HEI 11-278918 (1999) filed on Sep. 30, 1999 including specification, claims, drawings and summary is incorporated herein by reference in its entirety.

What is claimed is:

1. An extrusion molding method for a thin tube made of a synthetic resin material wherein a continuous product for a thin tube is formed by plasticizing and kneading a raw material composed of a synthetic resin material by means of an extrusion molding machine, extruding the plasticized and kneaded raw material from a molding die to form a tubular body having a circular cross section, further passing said tubular body on a sizing die to give a final inner diameter to the tubular body, cooling and hardening said tubular body, comprising the steps of:

coupling said molding die and said sizing die to each other by a connecting pipe;

making said sizing die from a carbon material;

supplying a first air to an interior of said sizing die through said connecting pipe; and supplying a second air to an interior of said molding die so that an air-lubrication layer is formed between an inner surface of said continuous product and an outer surface of said sizing die.

2. An extrusion molding method according to claim 1, wherein said synthetic resin material has high heat-resistance and high strength.

3. An extrusion molding method according to claim 1, wherein a frictional resistance caused between said inner surface of said continuous product and said outer surface of said sizing die is adjusted by controlling a flow rate and a pressure of said second air.

\* \* \* \* \*